United States Patent
Moore

(10) Patent No.: US 8,363,573 B2
(45) Date of Patent: Jan. 29, 2013

(54) METHOD FOR RINGCASTING WITH IMPROVED RELIABILITY

(75) Inventor: Sean Samuel Butler Moore, Hollis, NH (US)

(73) Assignee: Avaya Technology LLC, Basking Ridge, NJ (US)

( * ) Notice: Subject to any disclaimer, the term of this patent is extended or adjusted under 35 U.S.C. 154(b) by 1402 days.

(21) Appl. No.: 12/011,709

(22) Filed: Jan. 29, 2008

(65) Prior Publication Data

US 2009/0147704 A1 Jun. 11, 2009

Related U.S. Application Data

(63) Continuation-in-part of application No. 11/650,698, filed on Jan. 8, 2007.

(51) Int. Cl.
H04L 12/16 (2006.01)
H04Q 11/00 (2006.01)
(52) U.S. Cl. .................. 370/260; 370/424; 370/452
(58) Field of Classification Search .................. None
See application file for complete search history.

(56) References Cited

U.S. PATENT DOCUMENTS 5,136,580 A * 8/1992 Videlock et al. ............. 370/403

FOREIGN PATENT DOCUMENTS

| EP | 0 650 285 A1 | | 4/1995 |
|---|---|---|---|
| EP | 0650285 A1 | * | 4/2005 |

OTHER PUBLICATIONS

Enhancing Application-Level Multicast for P2P Conferencing; Xiaotao Wu et al. 5 pgs.
Congestion Avoidance and Control; Van Jacobson et al. Nov. 1998 pp. 1-25.
ALMI: An Application Level Multicast Infrastructure; Dimitrios Pendarakis et al. pp. 1-17.
rfc2001. txt; W. Stevens; NOAO Jan. 1997; TCP Slow Start, Congestion Avoidance, Fast Retransmit, and Fast Recovery Algorithms pp. 1-6.
rfc2581. txt; M. Allman; NASA Glenn/Sterling Software Apr. 1999 TCP Congestion Control pp. 1-13.
rfc3550. txt; H. Schulzrinne; Columbia University Jul. 2003 pp. 1-93; RTP: A Transport Protocol for Real-Time Applications.
rfc3940. txt; B. Adamson; NRL Nov. 2004 pp. 1-72; Negative-acknowledgement (NACK)-Oriented Reliable Multicast (NORM) Protocol.
European Search Report, No. EP 07 02 4489.2, Jun. 18, 2010.

* cited by examiner

*Primary Examiner* — Luat Phung
*Assistant Examiner* — Justin N Mullen
(74) *Attorney, Agent, or Firm* — Cozen O'Connor

(57) ABSTRACT

A method of ringcasting with improved reliability, in which a participant who is the source of content saves the signal in which the content is found, and compares received signals with the signal in which the content is found to ensure that the content has made it completely around the ring. If any particular piece of the content does not complete the ring, the content is re-transmitted from the participant around the ring. Sequence indices within the signal informs each participant of the sequence in which any particular piece of content is to be received so that, even if any particular piece of content is received out of order, it will be replaced in its proper sequence by a recipient.

5 Claims, 4 Drawing Sheets

METHOD FOR RINGCASTING WITH IMPROVED RELIABILITY

CROSS-REFERENCE TO RELATED APPLICATION

This application is a continuation-in-part of earlier filed and co-pending U.S. patent application Ser. No. 11/650,698, filed Jan. 8, 2007, the disclosure of which is hereby incorporated by reference.

BACKGROUND OF THE INVENTION

1. Field of the Invention

This invention is directed to the field of multicasting over a network, such as a network connecting multiple general-purpose and/or special-purpose computers such as telephones, and, more particularly, for a more reliable method of ringcasting.

2. Discussion of Related Art

In co-pending U.S. patent application Ser. No. 11/650,698, a method of multicasting via a ringcast is disclosed. In brief, the method disclosed therein is directed to ringcasting: a novel method of using a single logical, or application-level, connection in a packet-switching network (preferably based on TCP/IP protocols) to distribute real-time media content, such as an audio or video conference, to many recipients without using a centralized media server. The method disclosed in that application provides for establishing serial connections between the participants in a multicast, and then passing a signal from one participant to the next along the connections to distribute the content to every desired participant. The method offers the ability to distribute content, and particularly to distribute content in such a way as to meet the requirements for low-latency, real-time applications such as IP telephony audio/video conferencing, without the use of centralized (expensive) media servers to perform media functions such as mixing and multi-party distribution. The method also scales in multiple dimensions, e.g., each participant performs the same actions and uses the same number of (logical) network connections regardless of the number of participants in the session. The method for content distribution is intended to be used by applications that may have media distribution requirements for real-time and/or for low-latency, such as audio and video conferencing applications in which at least one of the media recipients is human, and that are loss-tolerant, i.e., the applications are mildly fault-tolerant in the sense that the applications perform effectively despite some content loss due to the dropping of packets during network traversal or during endpoint packet processing. For reference, IP telephones are often engineered to tolerate packet loss rates of between 1% and 10% while maintaining acceptable conversation quality as measured by some standard method.

Some applications, however, such as file-transfer applications which may transmit data files containing sensitive information, e.g., financial transactions, are loss-intolerant in the sense that they cannot recover from information loss which occurs if packets are lost during network transmission. For example, in a TCP/IP network, the internetwork-layer protocol, called the Internet Protocol (IP), makes a best-effort attempt to rout packets to their destinations but does not guarantee delivery of packets to their destinations. Packets may be dropped during transmission through a network if, e.g., a packet router queue overflows. Packet delivery guarantees (or lack thereof) are the responsibility of transport or transfer protocols used in layers above the IP layer. For example, at the transport layer immediately above the IP layer in the TCP/IP stack, two popular transport protocols are the User Data Protocol (UDP) and the Transmission Control Protocol (TCP). UDP does not guarantee packet delivery, whereas TCP does guarantee packet delivery. UDP and TCP are referred to as "unreliable" and "reliable" transport protocols, respectively. Both UDP and TCP are designed for unicasting, i.e., for transport of data between two hosts. If a networked application is loss-tolerant, it may use UDP, and in practice must use UDP if there is a low-latency requirement. Loss-intolerant applications may use TCP to ensure that the network delivers all packets transmitted between application hosts. Some loss-intolerant applications do not use TCP as the transport protocol because of concerns about scalability or overhead, in which case the application itself is responsible for reliability, i.e., detecting packet drops and recovering from them by, e.g., causing a re-transmission of any dropped packets.

Besides its loss tolerance (or intolerance) characteristic, an application may choose UDP or TCP depending on its latency requirements. For some applications with a low-latency requirement, such as voice and/or video conferencing between humans, TCP is not a practical option for reliability because the latency incurred from detection and re-transmission of dropped packets is often larger than application requirements. Hence, such applications typically use UDP as the transport protocol and additionally build in some degree of packet loss tolerance. Recall, though, that UDP is designed to support unicast data transport between two hosts, so in the case where data needs to be distributed simultaneously to multiple hosts, some additional mechanism, e.g., multicast or multiple unicasts, may be employed to accomplish the data distribution. The ringcast method of U.S. patent application Ser. No. 11/650,698 is appropriate for use as the media content distribution mechanism for these low-latency, loss-tolerant applications which include multiple participants.

Other multi-party applications, however, have a hard requirement for reliability, and would preferably use a reliable multicast to distribute content to multiple participants. Examples of such applications include multi-party collaboration, text chat, and notifications. Ideally, a reliable multicast protocol is available to distribute the content; however, a reliable multicast protocol has been elusive. The IETF has been developing the NORM protocol for reliable multicast, but it is an IP-level protocol and therefore in a TCP/IP network, the protocol must be implemented by the IP routers. Given that traditional (unreliable) multicast is often not available in commercial WANs, one can expect that the NORM protocol will similarly be largely unavailable. Furthermore, the NORM protocol is a one-to-many reliable multicast, i.e., only one participant may distribute content during each multicast; a many-to-many multicast is effected by having each sourcing participant separately perform a one-to-many multicast, which may be inefficient. Multi-party applications that need a reliable multicast for content distribution cannot depend on the network to provide it and therefore should implement an application-level protocol; however, no application-level, multi-party, reliable multicast protocol exists. The ringcast described in U.S. patent application Ser. No. 11/650,698 does not provide for reliability, but it is an application-level multicast that if modified to include reliability would be useful as a content distribution mechanism for loss-intolerant, multi-party applications. Thus, there is a need to ensure that participants in a ringcast receive all of the content distributed by the application.

OBJECTS AND SUMMARY OF THE INVENTION

It is therefore an object of the invention to provide a modified method of ringcasting.

It is another object of the invention to provide a method for ringcasting with improved reliability in which the source of any particular transmission stores each transmission when it is sent about the ring, and compares received transmissions with the stored transmission to determine if the transmission has made it completely about the ring and, if not, re-transmits the dropped transmission to ensure completion of the desired transmission.

It is a further object of the invention to provide a method for improving the reliability of ringcasts by embedding a sequence code in each signal in which the sequence of the ringcast content is identified, so that the receiving participants of the ringcast may sort the information received to ensure it is maintained in order by the receiving participant.

In accordance with one embodiment of the invention, a method of ringcasting with improved reliability is provided, in which a participant who is the source of content saves the signal in which the content is found, and compares received signals with the signal in which the content is found to ensure that the content has made it completely around the ring. If any particular piece of the content does not complete the ring, the content is re-transmitted from the participant around the ring. Sequence indices within the signal inform each participant of the sequence in which any particular piece of content is to be received so that, even if any particular piece of content is received out of order, it will be placed in its proper sequence by a recipient.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, in which like elements are identified with like numerals.

DETAILED DESCRIPTION OF THE PRESENTLY PREFERRED EMBODIMENTS

Figure 1:
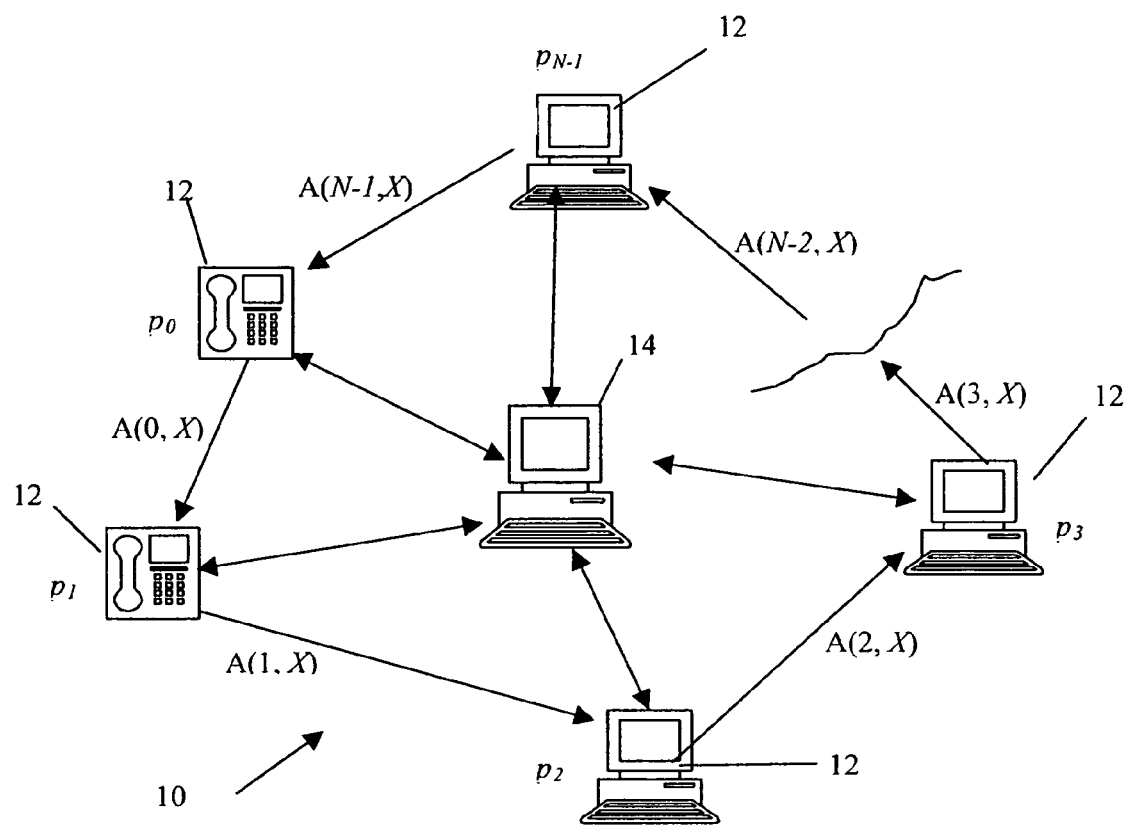
FIG. 1 illustrates a ring network of a plurality of participants in accordance with the invention.

FIG. 1 shows, generally at 10, a unidirectional ring in accordance with the invention. Ring 10 includes a plurality of participants ($p_i$) 12 who will participate in a ringcast, with participants represented as host computers of arbitrary type, e.g., general-purpose computers such as desktop PC's or special-purpose computers such as mobile or desktop telephones. The application using ringcast may be of any desired type, such as an audio broadast or data file distribution multicast, that may need a reliable ringcast. Participants 12 may be located anywhere, for example, in a single office unit, in remote locations of a single office, in far-flung offices throughout the world, etc. Each participant 12 may also be connected to a central control 14, implying that a centralized architecture is used for the control plane, although this is not a requirement for the present invention. Ring 10 is an integral part of the inventive method, shown generally at 100 in FIG. 2.

Figure 2:
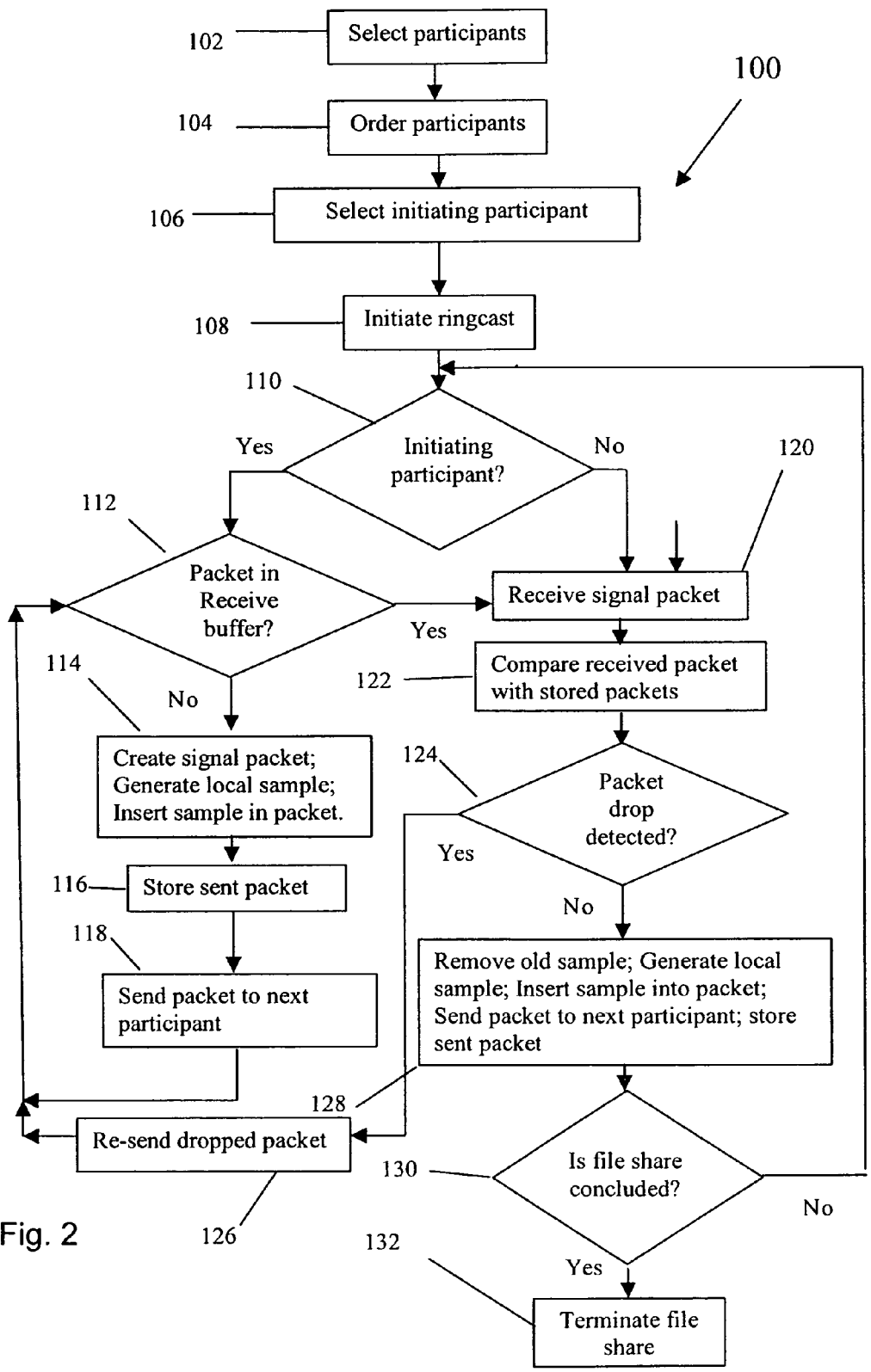
FIG. 2 is a flow chart showing the preferred steps involved in the practice of the inventive method.

As shown in FIG. 2, the first step (102) in method 100 is to select a plurality of N participants $p_i$ for the ringcast. Participants $p_i$ are then ordered (104) to form ring 10 (FIG. 1) containing participants $p_0$ through $p_{N-1}$. Participant $p_0$ is identified (106) as the originating, or initiating, participant, i.e., as the participant who is the initial source of some content distributed via the ringcast. The manner of ordering is not of great importance to method 100, and may be performed in any desired fashion. For example, participant $p_0$ may be selected as the person (if any) who originated the ringcast, as the participant who is deemed to be most likely to originate content during the ringcast, as the most senior participant in the ringcast, or even at random. Once participant $p_0$ is identified, the remaining participants are ordered as participants $p_1$ through $p_{N-1}$ in any desired fashion. For example, the participants may be ordered in the order in which they joined the ringcast, in the order in which they are deemed likely to participate, by the amount each is expected to participate, by their relative seniority or by their geographic proximity to each other and/or to participant $p_0$, or by their network location proximity. Ordering the participants $p_i$ by their geographic proximity to one another may have certain performance benefits, e.g. reduced delay, in the case of large ringcasts with multinational participants, but in most instances, where the ringcast is likely to have only a few participants who may be geographically nearby to one another, geographic ordering would be expected to have a minimal impact on the overall effectiveness of the inventive method.

Each participant $p_i$ is logically connected in ring 10 to a preceding participant $p_{i-1}$ and to a succeeding participant $p_{i+1}$, with participant $P_{N-1}$ being the preceding participant $p_{i-1}$ for participant $p_0$. The direction of ring 10 (shown by the directions of the arrows between the participants 12 in FIG. 1), which corresponds to the direction of content flow, is established by the ordering of participants $p_0$ through $P_{N-1}$.

Each participant $p_i$ is also connected to central control 14, which manages the identity and order of participants $p_i$ and other control-related information. By way of example, and not limitation, central control 14 may establish the protocols whereby certain participants $p_i$ may be classified as contributing participants $p_c$, who are entitled to contribute content (input) to the ringcast, or whereby other features of the ringcast (as discussed below) may be managed. Other control plane architectures may be used; the choice of control plane architecture is a mere matter of design choice.

Once the ordering of participants $p_i$ in ring 10 is established, the ringcast may be initiated (108) in any standard fashion. Suppose the application is a collaboration in which multiple participants post content, such as text, graphics, audio, and/or video files for distribution to all other participants. Each participant $p_i$ is associated with means for outputting the content, such as a web browser, or other user interface application, hosted by a general-purpose computer such as a desktop PC or even a special-purpose computer such as a desk phone or mobile phone with an audio speaker. It is preferred that, in most instances, each participant $p_i$ would also have means for accepting an input from that participant $p_i$, although that is not always required. In the case of a multi-party collaborative application using ringcast, where, for example, at any given time a few participants may be contributing content and a large number of participants may be receiving content (e.g., a panel discussion), not every participant may be expected (or even permitted) to contribute to the ringcast. Thus, only designated contributing participants $p_c$ Would require means to accept an input at their location, while all other participants $p_i$ need only have means at their location for outputting content, such as an audio and/or video signal or text file.

Figure 3:
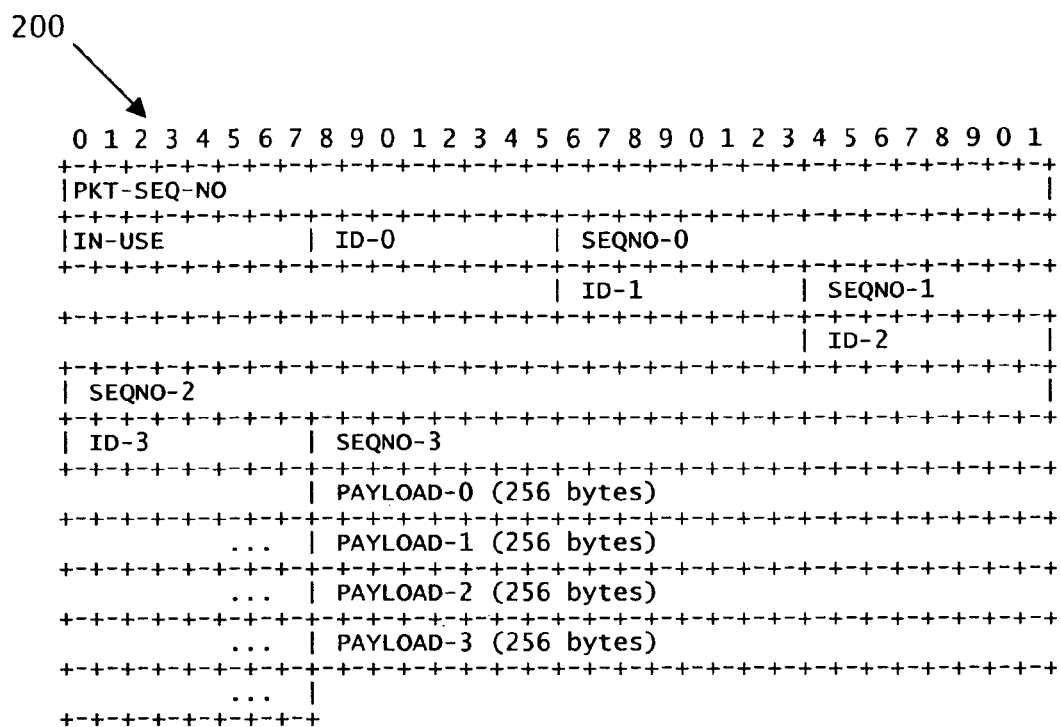
FIG. 3 is a representation of the information contained in a signal used to practice the inventive method.

Once the ringcast is initiated (108), each participant executes similar logic, beginning with a self-identity check (110) as to whether the participant is the designated initiating participant $p_0$. If the participant is $p_0$, then the receive buffer is checked for a signal packet as a test to determine whether or not a new signal packet needs to be generated (112). If the receive buffer is empty, then a new signal packet is created (114). During the first execution of this logic (114), a locally generated content chunk, or block, or sample $S(0, 0)$ is created by the means at that participant's location and identified with a first index range, e.g., a local time interval $t_0$ in the case of a real-time audio file, or a byte sequence range in the case of a stored file. The input may be generated in any known fashion, such as by the use of a G.711 codec for audio, a keyboard for text, a file read operation for data, etc. For the notation $S(x, y)$, the x parameter indicates the index of the participant $p_x$, which serves as a source identifier and the y parameter indicates the sequence index of the local content, and serves as a sequence identifier. The concatenation of all of the local content blocks for a given participant represents the entire content file, As aforementioned, when initiating participant $p_0$ gathers the first block $S(0, 0)$, participant $p_0$ creates (114) a signal 200. Signal 200 is shown in FIG. 3.

Signal 200 is generally referred to as a "packet", and that term will be used herein to refer generally to signal 200. A packet, such as packet 200, is an electronic signal sent along a network having a prescribed format. In this exemplary instance 200, the packet is an application packet which may be encapsulated in the payload of a TCP/IP transport protocol packet, such as a UDP packet, which itself may be encapsulated in the payload of an IP packet. The format includes a first portion of the signal in which control information is contained, referred to as the "header", and a second portion of the signal in which the information being sent (the "payload") is contained. The payload is, essentially, the portion of the signal which is of substantive interest to the recipient or application, while the header contains control information, such as origin, destination, format, size and other necessary information. In the preferred embodiment, the signal may include a series of nested headers (described below), and so the application packet 200 and its actual payload, i.e., the information corresponding to the actual signal which is to be generated by the participants 12, may be deep inside an outermost packet.

Application packet 200 is sufficient to support a basic reliable ringcast; for reference, the packet structure will be referred to as the Simple Reliable RIngcast Protocol ("RRP"). The fields in signal 200 have the following interpretation and logic:

PKT-SEQ-NO: Used by the (unique) initiating participant $p_0$ to associate a number sequence with packets. Its purpose is to support packet drop detection and recovery. When the initiating participant $p_0$ begins a ringcast session and creates the initial session packet, it must write an initial sequence number in this field. For each newly created or re-used packet that the initiating participant $p_0$ subsequently sends into the network, the initiating participant $p_0$ increments the sequence and writes the value into this field. Note that when a packet is dropped and the initiating participant $p_0$ re-sends a copy of the dropped packet, this field is not written with a new sequence value but retains the original value from when the packet was first sent. Only the initiating participant $p_0$ can write a value into this field; all other participants in the ring can only read the value.

IN-USE: Bits 0-3 are used to indicate whether the associated fields are available for use, i.e., if a participant wants to ringcast some data, and if Bit X is currently set to "0" indicating availability, then Bit X will be marked with a "1" to indicate that the ID-X, SEQNO-X, and PAYLOAD-X fields are in now in use and therefore unavailable to any other participant that wants to cast. When the sourcing participant is finished with its ringcast, it must mark Bit X with a "0", indicating that the ID-X, SEQNO-X, and PAYLOAD-X fields are now available for use. When the Reliable Ringcast Protocol ("RRP") packet is initially created by the initiating participant $p_0$, Bits 0-3 must all be marked with a "0". Bits 4-7 are not used—they have been allocated to the IN-USE field in order to size the RRP header to an integer number (17) of bytes, as processing logic often assumes byte-sized data. Clearly, this field definition defines an upper limit of four (4) casting participants in a given session. Bits 4-7 could be used if more sourcing participants are desired (up to a maximum of eight) and appropriate modifications are made to the rest of the header.

ID-X: The participant ID of a participant currently ringcasting data. The participant ID will be created by some session control logic associated with the application that is using the ringcast. ID-X is an 8-bit field, which imposes a limit of 256 uniquely identifiable session participants.

SEQNO-X: The sequence number of the first byte of data in the PAYLOAD-X field. The sequence number is used to support ordered data transfer, as packets may be dropped or arrive at destinations in a different order than the order in which they were sourced.

PAYLOAD-X: Contains up to 256 bytes of the data being ringcast by the casting participant identified by the value in the ID-X field.

Note that the Simple RRP packet structure is static in the sense that the locations and sizes of all fields, including payloads, are known and can be "hard-wired" into the header processing logic, thus simplifying that logic. The disadvantage of this approach is that it can be space-inefficient—an adverse property mitigated as described below with a header format that supports space efficiency—but it is sufficient for operation of reliable ringcast and will simplify the description of it.

In contrast, the alternative header described below and in FIG. 4 supports space efficiency but at the cost of a more complex header and associated processing logic. There is an inherent tradeoff between space efficiency and header/processing logic—an actual implementation or a standard needs to pick the balance point that is optimal for the environment and requirements. For example, if a solution based on reliable ringcast is expected to support well-resourced endpoints attached to the network by low-bandwidth access links, then the RRP packet/header design should be biased towards supporting space/bandwidth efficiency; if instead the solution is expected to support resource-starved endpoints connected by a high-speed LAN, then the packet/header design should be biased towards supporting processing logic efficiency.

A point of terminology: each ID-X, SEQNO-X and PAYLOAD-X triplet is referred to as a "channel", and a specific channel is referred to as "channel X", where X is one of the values 0-3.

In one preferred (but by no means only) embodiment of the invention, ring 100 is formed over the Internet, and the ringcast is intended to distribute data to applications that are sensitive to dropped packets.

Even though a host general-purpose computer may be the recipient (participant) of the ringcast, the same can be accomplished by the use of special-purpose computers such as telephones with suitable hardware and software to accommodate the required protocols, and one of ordinary skill in the art would understand how to accomplish the use of computers and/or telephones as participants $p_i$ in ring 10 without undue experimentation. From the perspective that a telephone is a special-purpose computer, and from the perspective that a general-purpose computer may host a telephony application that emulates a telephone, the type of host computing device that embodies a participant in a reliable ringcast does not affect the applicability of the invention.

Returning to FIG. 2, once the initiating participant $p_0$ generates (step 114) the first signal 200, that signal becomes part of a stream of signals traveling around ring 10. Signal 200 starts as a signal $A(0, 0)$ (FIG. 1), i.e., an application packet, where the x and y parameters of $A(x,y)$ have the same interpretation as those of the content signal $S(x, y)$, and is transmitted (118) to the next succeeding participant $p_1$. In addition, participant $p_0$ stores signal $A(0, 0)$ (116), preferably locally, for later comparison, as will be described. Signal $A(0, 0)$ contains both a sequence identifier and a source identifier. After storing signal $A(0, 0)$, participant $p_0$ sends the packet to the next participant $p_1$ (118).

Under an assumption that the time for the signal packet $A(0, 0)$ to traverse the ring is greater than the sampling, or data collection, interval, i.e., the time duration to acquire another block of content to be placed in a next packet, then while $A(0, 0)$ is traversing the ring (120), participant $p_0$ is generating other signal packets $A(0, 1)$, $A(0,2)$ ... containing samples $S(0, 1)$, $S(0, 2)$ ... respectively. For example, if the content file is an audio file and the sampling interval is 20 ms, and the ring traversal time is 200 ms, then $p_0$ will generate ten (10) signal packets $A(0, 1)$, $A(0, 2)$ ... $A(0, 9)$ before it receives $A(N-1, 0)$, which began the ring traversal as $A(0, 0)$, from participant $p_{N-1}$. For the purposes of this description, we will identify as M the number of signal packets generated by $P_0$ while $A(0, 0)$ is traversing the ring, which means that when $p_0$ receives $A(N-1, 0)$, it has generated sample $S(0, M)$, and after removing $S(0, 0)$ from $A(N-1, 0)$ in Step 128, it will combine $S(0, M)$ with $A(N-1, 0)$ to form $A(0, M)$. As aforementioned, $P_0$ detects when $A(0, 0)$ has traversed the ring by checking if $A(N-1, 0)$ is in its receive buffer (112).

Upon receipt of each packet, participant $p_i$ checks to determine if the packet contains information that originated with that participant $p_i$, by checking the sequence and source identifiers therein (122). If the participant is the initiating participant $p_0$ and the received packet has a sequence value greater than the next expected sequence value of a signal that originated with that participant $p_0$, then that participant $p_0$ determines that the missing packet has been dropped from the transmission. Any dropped packet is re-sent (126) by $p_0$ and any new signal is stored (128).

The first execution of Step 120 occurs at $p_1$ and immediately after $p_0$ has sent $A(0, 0)$ to participant $p_1$.

If participant $p_1$ is a contributing participant $p_c$, then participant $p_1$ also has a sample $S(1, 0)$ to contribute. Once signal $A(0, 0)$ reaches contributing participant $p_1$, therefore, participant $p_1$ gathers its sample $S(1, 0)$ (128). Participant $p_1$ then copies the contents of $A(0, 0)$ into local memory, inserts $S(1, 0)$ into $A(0, 0)$ to form $A(1, 0)$, and sends $A(1, 0)$ to participant $p_2$. If the signal packet is traversing the ring for the second time, then upon reception from $p_0$ the signal packet is identified as $A(0, M)$, $p_1$ removes $S(1, 0)$ from $A(0, M)$ (presuming that $A(0, M)$ has not been dropped), copies the contents of $A(0, M)$ into local memory, inserts $S(1, M)$ to form $A(1, M)$, stores $A(1, M)$ for future reference in detecting and recovering from packet drops, and sends $A(1, M)$ to participant $p_2$. $S(1, 0)$ (and $A(1, 0)$) may be removed from local store because all the other participants have already received sample $S(1, 0)$ so there is no need to distribute it again to the other participants.

Next in Step 130, participant $p_i$ checks if the file share has concluded; if not, then Step 110 is executed again, otherwise it terminates the file share (132).

In this fashion, each participant $p_i$ is able to generate a sample (data, audio, audio/video, text, etc., as appropriate to the application) corresponding to the intended received portion of the ringcast, and is able to pass along on ring 10 the entire ringcast contents, efficiently, and without regard to the number of participants $p_i$ and terminating (132) when the file share is over.

Each connection is logical, or application-level, e.g., the connection from $p_0$ to $p_1$ is represented in the application instance executing on $p_0$ by the IP address of $p_1$ and a (UDP) port number on which the application instance executing on $p_1$ listens for incoming packets. In general, a connection may be represented as the pair (IP_address($p_i$), port_no($p_j$)); specifically for a ring overlay, each participant $p_k$ has two connections:

Ingress: (IP_address($p_{(k-1)}$), port_no($p_k$)), and
Egress: (IP_address($p_{(k+1)}$), port_no($p_{k+1}$)).

One-to-Many RIngcast

To distribute information to each participant in the ring in a one-to-many multicast mode, $p_0$ and the other participants $p_k$ host some file-sharing distributed application that uses the reliable ringcast facility. $p_k$'s instance of the application knows to listen on the ingress port_no($p_k$) for reliable ringcast packets sent by $p_{k-1}$. $p_0$ first creates an application packet according to some protocol understood by the application, such as the Simple RRP described above. The application packet consists of header information and the payload content. The payload content itself may be structured according to some protocol that may (or may not) provide for the transmission of meta-information about the content for use by the application. For example, if the application invokes the transmission of an audio file that was generated by recording a real-time telephone conversation, the payload may be an RTP packet composed of an RTP header and voice waveform information, and the application address will be the RTP SSRC identifier contained in the RTP SSRC field. If the application is some simple file sharing application, the payload may only contain content and no meta-information. In any case, after creating the application packet, participant $p_0$ then creates a transport protocol packet—we will assume (unreliable) UDP—with the application packet as the UDP packet payload and with the destination port number field of the UDP packet header set to port_no($p_1$). Next, $p_0$ creates an IP packet with the UDP packet as the IP packet payload and the destination address field in the IP packet header set to IP_address($p_1$). Finally, $p_0$ creates a frame of the appropriate link protocol (e.g., Ethernet), with the IP packet as the frame payload and the frame header containing the link address of the next link-level switch or host on the path to $p_1$. For simplicity of discussion, assume that a single link directly connects participant $p_1$ with $p_{i+1}$, and therefore the link address is that of the host for $p_{i+1}$, but in practice it could be the case that a series of links, i.e., a link-level path, connects $p_i$ with $p_{i+1}$. Whether or not there is one or multiple links that compose the link-level path between $p_i$ and $p_{i+1}$ is not generally known by the application nor does it affect the invention, as link-layer logic will ensure that the packet traverses the path between $p_i$ and $p_{i+1}$ without any intervention or awareness from the reliable ringcast logic. The frame is then sent over the link to $p_1$.

Upon receiving the frame from $p_0$, $p_1$ extracts the application packet and hands it off to the application instance executing on $p_1$ for the application to process. $p_1$ must now transmit the application packet to $p_2$. $p_1$ repeats the process used by $p_0$ to transmit the application packet to $p_1$, but sets the destination IP address in the IP packet header to IP_address($p_2$), sets the port number in the UDP header to port_no($p_2$), and creates a new frame containing the link address of $p_2$'s ingress link, then forwards the frame on to $p_2$. Each successive participant repeats a similar process and thereby transmits the application packet (and content) sourced by $p_0$ around the ring.

Eventually, $p_{(N-1)}$ forwards a frame containing the application packet to $p_0$. As $p_0$ was the original source of the data, which it determines by comparing its application address with the source address of the application packet, it does not need a copy of the application packet and can drop the entire frame (although as noted below, for "many-to-many" ringcasts, that application packet should not necessarily be dropped by $p_0$ after a ring traversal). Note that the preceding discussion assumes that the packet is not dropped during ring traversal; packet drop detection and recovery is discussed below.

Some Observations:

(1) After $p_0$ sources an initial packet, it continues to source and forward application packets until the application stops creating information to be distributed to all of the participants.

(2) All packets (and the frame) from each level of the TCP/IP stack are modified in some way during ring traversal except the application packet (at least for this one-to-many mode example; a "many-to-many" ringcast may behave differently in this aspect).

(3) Preferably, the ringcast will initially be an application-level multicast and, also preferably, will use UDP as the transport protocol. As such, ringcast logic executing on a host will be bound to some local UDP port(s). The ports may be determined dynamically, or the ringcast applications may decide to use a particular set of ports. Regardless, ringcast is an application-level protocol, so it may be defined and described independently of the underlying TCP/IP layers.

Many-to-Many Ringcast

A "many-to-many" multicast is a situation where more than one participant in a session originates data that is simultaneously transmitted to all of the other participants in the session.

In a traditional many-to-many multicast, a minimum spanning tree connects the participants. Each participant that sources media information uses a one-to-many multicast to distribute the media to all other participants; in effect, the many-to-many multicast is implemented as multiple one-to-many multicasts. Many-to-many (unreliable) multicasting with a minimum spanning tree (MST) is a typical media distribution solution used in P2P voice conferencing.

With ringcasting, a many-to-many multicast may be achieved by having each sourcing participant perform a one-to-many ringcast (as in the base ringcast description above); however, the ring structure allows for a different approach to many-to-many (reliable) multicast which may be more efficient, more flexible, and less complex to manage than multiple one-to-many (reliable) ringcasts. The basic approach is to use a single ringcast (instead of multiple one-to-many ringcasts) in which a single application packet transports information for every sourcing participant, as follows:

Identify (arbitrarily) a single initiating participant which creates and launches application packets;

as an application packet traverses the ring, upon receiving an application packet, each participant copies the payload of the application packet into local memory for processing by the local application instance;

after copying the payload, each participant also inserts any information it wants to distribute into the application packet payload but without writing over other participants' information. Before inserting any information, however, each participant must remove any information it inserted in the payload during the application packet's previous traversal of the ring.

The two main concepts to note in the many-to-many ringcast description are that (a) once created, an application packet is never discarded; it is used for the lifetime of the session (or at least as long as there is a participant that wants to distribute information), and (b) the application packet payload simultaneously transports information from multiple participants. To manage the multi-source payload, an application packet protocol such as Simple RRP described above is necessary to manage the distribution. It should be noted that the application packet protocol may need to change in order to meet the requirements of the application. For example, Simple RRP may be used to support reliable, many-to-many ringcasting. In co-pending U.S. patent application Ser. No. 11/650,698, a different application packet protocol is used in order to support real-time, low-latency, many-to-many ringcasting. In general, it may be the case that there does not exist a single ringcast protocol which simultaneously supports reliability, real-time, and low-latency. Evidence for this conjecture includes the existence of different TCP/IP transport protocols, e.g., UDP and TCP, for supporting unreliable but low-latency unicasts and reliable unicasts, respectively.

Reliable Ringcast

In TCP/IP networks, because the IP protocol does not guarantee packet delivery, IP routers and switches are allowed to discard (or "drop") packets. Packet drops are most often attributable to packet buffer overflows in routers and switches. To guarantee packet delivery, a reliable transport protocol above IP must be used.

TCP has been highly successful as the reliable unicast transport protocol of the Internet and other TCP/IP networks. TCP works by detecting and re-transmitting any dropped packets. The TCP sender/source detects packet drops by tracking the acknowledgement packets (or lack thereof) sent by the TCP receiver/sink to the sender each time it receives a packet. The acknowledgements function as a feedback mechanism, i.e., they "close the loop". TCP also employs simple rate and congestion control mechanisms which have proved to be effective and robust.

Reliable multicast has been elusive. Although a solution—the NORM protocol—has been put forward by the IETF reliable multicast transport (rmt) working group (B. Adamson, et al., "Negative-acknowledgement (NACK)-Oriented Reliable Multicast (NORM) Protocol", RFC 3940, http://www.ietf.org/rfc/rfc3940.txt), NORM is quite complex. A reliable multicast based on ringcast is straightforward and will be described below.

The target environment for NORM is global-scale Internet multicasts, whereas reliable ringcast may only be practical at small scales, but nevertheless a simple solution is needed for the small scale environment, particularly to support P2P collaboration applications. Also, as noted above, NORM is intended to be implemented in IP routers and switches that compose a TCP/IP network; hence, for an application to use NORM (or traditional unreliable IP multicast), it is dependent on the network to provide NORM and IP multicast—in practice, NORM and IP multicast have not been supported in commercial WANs. Hence, an application-level reliable multicast is needed.

Reliable ringcast is modeled after TCP, albeit at the application level (vs. the transport level, or Layer 4 in the TCP/IP protocol stack, of TCP). The closed-loop characteristic of TCP is also (and obviously) an intrinsic characteristic of ringcast. This common architectural characteristic is the basis of the decision to model reliable ringcast after TCP. In ringcast, because each packet that is created and forwarded by a host eventually returns to the host unless it is dropped somewhere in the ring, some straightforward bookkeeping is all that is necessary to detect a packet drop and then re-transmit the packet. Similarly, congestion control for reliable ringcast may be modeled after TCP congestion control. Such an approach ensures that reliable ringcast is "TCP-friendly" (M. Allman, et al., "TCP Congestion Control", RFC 2581, www.ietf.org/rfc/rfc2581.txt), which means that reliable ringcast may peacefully co-exist with TCP unicast flows in a network. Remember though, that the packets are transported using UDP, not TCP; the reliability is effected at the application level by using similar reliability logic as that of TCP.

One-to-Many Reliable Ringcast

Described first is a one-to-many reliable ringcast with participant $p_0$ as the initiator. Although TCP has fairly simple logic and data structures, its dynamic behavior is relatively complex, so rather than describe all of the behaviors of TCP and their analogs in reliable ringcast, logic blocks of TCP are mapped to the application-level analogs for reliable ringcast. Any changes to the logic will be observed, and mappings will be detailed when there are changes to the logic and data structures. Much of the logic and data structures of TCP are copied directly by reliable ringcast with only a relatively small portion of it being modified. The dynamic behavior of reliable ringcast with respect to the packet flow will be nearly identical to that of TCP. Most of the modifications are caused by (a) the non-existence of a TCP header in the packets transported using reliable ringcast (UDP is the transport protocol), and (b) the non-existence of an explicit acknowledgement packet in reliable ringcast. The description below identifies where TCP logic is used as the model for the logic in reliable ringcast and focuses on the details of logic modifications due to the preceding characteristics (a) and (b).

Simple Reliable Ringcast Header

Reliable ringcast uses TCP's concept of sequence numbers to detect and handle packet drops. In TCP, sequence number information is contained in the TCP header. Ringcast preferably uses UDP, not TCP, as the transport protocol, and because the UDP header does not have fields that may be used to transport sequence number information, such information needs to be contained in the header of a reliable ringcast application packet (which is encapsulated by UDP in the UDP payload). Hence, as with the many-to-many base ringcast described above and with real-time ringcast described in Ser. No. 11/650,698, the UDP packet payload for reliable ringcast will consist of an application packet with a header describing the organization of the application packet's payload and containing information (such as sequence numbers) needed by the reliable ringcast application. For reference, the structure of the application packet is a protocol referred to as the Reliable Ringcast Protocol ("RRP"); an exemplary Simple RRP is described above. An application packet conforming to the RRP will be called an "RRP packet", and the associated header will be called an "RRP header".

The TCP header cannot be used as the RRP packet header, because the TCP header could not support the requirements of a many-to-many reliable ringcast, and it appears to be inefficient to have two different header protocols for the two different reliable ringcast modes (one-to-many and many-to-many) when it is possible (as described below) to use the same header protocol and the same header processing logic for both modes. Also, use of a single header protocol and unified logic for either mode will afford a capability to transition seamlessly between one-to-many and many-to-many reliable ringcasts, as a one-to-many reliable ringcast will behave as a special case of many-to-many reliable ringcast in which there is only one source that is transmitting information at a given time.

The first header, the Simple RRP header, described above and shown in FIG. 3, is sufficient for use in describing reliable ringcast operation, but in practice a more complex header (and associated logic) would be needed to avoid space inefficiencies (which in this case manifest as bandwidth inefficiencies).

For the Simple RRP header, the header processing logic contained at each ring participant makes these assumptions:

(a) regardless of the number of participants in the session, at most four participants can transport their information in a packet at any given time. A participant that is currently transporting information is called a "sourcing participant"; and (b) for each packet, the payload space for each sourcing participant is fixed at 256 bytes.

One-to-Many Reliable Ringcast Operation Using Simple RRP

As described in Allman, et al., referenced above, a reliable transport protocol must be able to detect and recover from packet drops, and in order to be effective in a TCP/IP network, it also should implement TCP-friendly congestion avoidance and a slow-start mechanism.

All of the descriptions mentioned above are conducted in the context of a one-to-many reliable ringcast, in order to simplify the description and thereby focus on the detection and recovery, congestion control, and slow-start mechanisms without the clutter of the details of many-to-many reliable ringcast. The described reliable ringcast protocols and algorithms are independent of whether one-to-many or many-to-many reliable ringcast is in effect.

A one-to-many reliable ringcast is similar to the known one-to-many ringcast described above, in that the participants are logically connected in a ring, and there is an initiating participant that initiates a ringcast session and data transmission to the other participants by creating and launching packets. Reliable ringcast logic differs from unreliable ringcast when creating packets, when processing packets, when handling packets that have traversed the ring, and when detecting packet drops and recovering from them.

Without loss of generality, it is assumed that $p_0$ is the initiating participant that creates packets. When $p_0$ initiates the ringcast, it creates a Simple RRP application packet, call it $R_0$, by (a) writing an initial sequence number value into the PKT-SEQ-NO field;

(b) setting the IN-USE Bits 0-3 to all zeroes but then marking one of them, say Bit 0, with a 1 to signal its ownership of channel 0 (the ID-0, SEQNO-0, and PAYLOAD-0 fields);

(c) writing its participant ID in the ID-0 field;

(d) writing an arbitrary integer value between 0 and 65535, say 100, in the SEQNO-0 field, which is the sequence number of the first byte of data in PAYLOAD-0;

(e) writing the first 256 bytes of the data to be ringcast into the PAYLOAD-0 field. Of course, if the entire data chunk is less than 256 bytes, then the entire chunk is written into the PAYLOAD-0 field using, for example and without loss of generality, left-justification.

$p_0$ then encloses $R_0$ in a UDP packet with appropriate values in the UDP header, encloses the UDP packet in an IP packet with appropriate values in its header, encloses the IP packet in a frame (e.g., an Ethernet frame), and sends it to $p_1$. $p_0$ makes a copy of the packet and stores it locally, to be used for detecting when a packet has successfully traversed the ring or has been dropped and for recovering from a packet drop.

When $p_1$ receives $R_0$, it first examines the IN-USE field for any marked bits—in this case, Bit 0 is marked, indicating that the participant with the ID value stored in ID-0 is ringcasting some data. $p_1$ then copies PAYLOAD-0 into a local buffer it allocates for storing data from this participant and feeding the data to some local application, and it uses the SEQNO-0 value to properly place the PAYLOAD-0 data into the buffer. $p_1$ also locally copies the PKT-SEQ-NO and SEQNO-0 field values for possible later use in recovering from packet drops, and then forwards $R_0$ on to $p_2$. $p_2$ executes a similar process as $p_1$ and forwards $R_0$ on to $p_3$; and so on.

If $p_0$ has more data to send, and assuming $R_0$ has not yet traversed the ring, it creates another application packet $R_1$ with the same values in the IN-USE and ID-0 fields as in $R_0$, the SEQNO-O field value set to 100+256=356, the PAYLOAD-0 field set to the next 256 bytes of data, and the PKT-SEQ-NO field set to the next packet sequence number. $R_1$ is then sent to $p_1$, which processes and forwards $R_1$ similarly to how it processed and forwarded $R_0$. More specifically, when $p_1$ receives $R_1$, as with $R_0$ it examines the IN-USE field and ID-0 fields to verify that PAYLOAD-0 is data from the same source as $R_0$, copies PAYLOAD-0 into the same local buffer as before by concatenating the new data contained in $R_1$'s PAYLOAD-0 field to the data contained in $R_0$'s PAYLOAD-0 field, and locally stores the PKT-SEQ-NO and SEQNO-0 field value for use in recovery. $p_1$ then forwards $R_1$ on to $p_2$, which executes a similar process as $p_1$ and then forwards $R_0$ on to $p_3$; and so on.

Eventually, $p_0$ will reach the end of the data file it is transmitting and will send a final packet containing valid data. Note that it is likely the case that this final data chunk will not be of length 256 bytes, and hence there will be some meaningless data in part of the PAYLOAD-0 field. All of the other participants, however, will copy the entire PAYLOAD-0 field into the local buffer associated with $p_0$'s data transmission, including the meaningless data. Note that this should not be problematic, as the meaningful data will likely terminate with a bit string that is interpreted by the receiving application as the end of the meaningful data. For example, if $p_0$ is transmitting an ASCII file, then the last byte in the file may be the EOT or ETX character; the application reading the data in from the local buffer will ignore any data appearing in the buffer after one of these file termination characters.

Eventually, $R_0$ traverses the ring when $p_{N-1}$ sends $R_0$ back to $p_0$. If $p_0$ has more data to send, then it should re-use the application packet by writing a new value of PKT-SEQ-NO, SEQNO-0, and a new PAYLOAD-0 (the ID-0 field should still have ID-0 set to $p_0$'s ID), and forwarding the packet to $p_1$. Note that for one-to-many reliable ringcast, the packet could just be dropped and $p_0$ could generate a new packet; but for the many-to-many case the packet must not be dropped. If one treats one-to-many reliable ringcast as a special case of many-to-many ringcast, then the proper many-to-many logic should always be applied and should function correctly for the one-to-many special case. Hence, the $R_0$ packet should be re-used and forwarded on to $p_1$. Subsequent packets $R_1$, $R_2$, etc. also traverse the ring and are handled similarly by $p_0$ to the way it handles $R_0$.

When $p_0$ has finished transmitting all of its data, it needs to send one more packet, which we will identify as $R_Z$, with Bit 0 of the IN-USE field set to 0. If this is a one-to-many reliable ringcast, all of the meaningful bits 0-3 in the IN-USE field are set to "0". All zeroes in the IN-USE array Bits 0-3 is a signal to the rest of the participants that $p_0$ has finished transmitting data, and that the ringcast session has terminated (and thus session data such as local copies of sequence numbers may be flushed). When any participant receives $R_Z$, it will notice that Bit 0 is set to "0", indicating that $p_0$ has finished its data transmission using channel 0 and that there is no valid data in PAYLOAD-0. When $R_Z$ traverses the ring and arrives at $p_0$, in the one-to-many reliable ringcast case, $p_0$ may terminate the session. After sending $R_Z$, there is likely to be packets that are still traversing the ring; $p_0$ should either drop these as they return, or alternatively, if $p_0$ wants to support a many-to-many reliable ringcast, it should handle these packets as described below.

Packet Drop Detection and Recovery

Similar to TCP, one-to-many reliable ringcast uses values in the PKT-SEQ-NO field to detect packet drops, as follows. Suppose $p_0$ sourced and transmitted packets $R_{i-1}$, $R_i$, and $R_{i+1}$ with the PKT-SEQ-NO field set to values $s_{i-1}$, $s_i$, and $s_{i+1}$, respectively. Recall that when $p_0$ creates or re-uses packets, it locally stores the PKT-SEQ-NO field values for possible later use in packet drop detection. Now suppose further that packet $R_i$ gets dropped during ring traversal, and for simplicity of description, assume that it is the first packet to have been dropped and that $R_{i-1}$, and $R_{i+1}$ do not get dropped. When $R_{i-1}$ traverses the ring and arrives at $p_0$, $p_0$ compares the sequence number $s_{i-1}$ in the PKT-SEQ-NO field of $R_{i-1}$, with the sequence number that it expects the next incoming packet to have, i.e., $s_{i-1}$. Because the two sequence numbers match, $p_0$ knows that $R_{i-1}$ successfully traversed the ring. Hence, $p_0$ may discard the local copy of $R_{i-1}$ that it stored when it earlier launched $R_{i-1}$ into the ring.

$p_0$ now expects the next incoming packet to have $s_i$ as the value in its PKT-SEQ-NO field, i.e., the sequence number in $R_i$. Since $R_i$ was dropped, however, the next incoming packet, $R_{i+1}$, has the sequence number $s_{i+1}$. When $p_0$ compares the next expected sequence number $s_i$ with the sequence number of the next incoming packet and finds that they are not equal, it then assumes that packet $R_i$ was dropped (note that in some variants of TCP, for performance reasons the packet drop detection logic waits until it receives one more acknowledgement packet with an unexpected sequence number before assuming a packet has been dropped. Similar logic could be applied here, if desired). Recall that when $p_0$ first sent $R_i$, it locally recorded a copy of $R_i$; so upon detecting that $R_i$ was dropped, $p_0$ retrieves the local copy of $R_i$ that it sent earlier and sends it into the ring.

Note that all of the other (non-initiating) participants in the ring are using similar logic as $p_0$ for tracking packet sequence numbers and SEQNO-0 field values of $p_0$'s data transmission in order to keep the data properly ordered (in TCP/IP networks, the IP protocol does not guarantee in-order packet delivery, so higher-level protocols, such as TCP or reliable ringcast, are needed to guarantee in-order delivery of data) and to detect when a packet was dropped. When any non-initiating participant detects that $R_i$ was dropped, it assumes that the initiating participant will re-send it. Hence, a non-initiating participant's logic differs from the initiating participant's for handling a packet drop detection, as a non-initiating participant cannot re-create $R_i$ because it has no way of knowing what $p_0$ wrote into $R_i$'s PAYLOAD-0 field.

Some participants will receive $R_i$ twice and will need to be able to detect this situation and properly handle it. For example, suppose participant $p_j$ received $R_i$ but that $R_i$ was dropped before $p_{(j+1)}$ received it. By tracking packet sequence numbers, when the re-sent/recovered $R_i$ arrives at $p_j$, $p_j$ should detect that it has already received and processed $R_i$. $p_j$ should not process the re-sent $R_i$ but instead should just forward it on to $p_{(j+1)}$.

When a participant such as $p_{(j+1)}$ does not receive $R_i$ during its first ring traversal attempt but does receive the re-sent $R_i$ during its subsequent ring traversal attempt, it handles $R_i$ as an out-of-order packet by copying the contents of $R_i$'s PAYLOAD-0 field into the local buffer between the contents of $R_{i-1}$'s and $R_{i+1}$'s PAYLOAD-0 contents, and then forwarding $R_i$ to the next participant in the ring (such as $p_{(j+2)}$). The SEQNO-0 field values may be used to assist in inserting data into the proper location in the buffer.

To avoid clutter not all boundary conditions, degenerative cases, etc., have been discussed, nor have all of the logic variations employed by TCP variants to improve performance, e.g., SACK, delayed ACK, Fast Re-Transmit, Fast Recovery, handling timeouts, etc. When implementing reliable ringcast, one of ordinary skill in the art of TCP/IP network programming and familiar with the details of the TCP protocol and the TCP variants would be able to create proper logic for handling boundary conditions, degenerative cases, protocol logic variations, etc., without undue experimentation.

Congestion Avoidance and Slow-Start

Early TCP implementations did not employ congestion avoidance and control, which led to a series of Internet collapses beginning in 1986 (see, V. Jacobson, "Congestion Avoidance and Control", Proceedings of SIGCOMM '88, Stanford, Calif., August 1988) and eventually led to a re-work of the TCP protocol to include congestion avoidance and control algorithms, including the slow-start algorithm (Allman; and W. Richard Stevens, "TCP Slow Start, Congestion Avoidance, Fast Retransmit, and Fast Recovery Algorithms", RFC 2001, http://www.ietf.org/rfc/rfc2001.txt). One outcome of this is that any reliable transport protocol, such as reliable ringcast, must use TCP-friendly congestion avoidance and control in order to peacefully co-exist with other traffic on TCP/IP networks. Thus, reliable ringcast must employ TCP-friendly congestion avoidance. A description of how this may be accomplished follows.

The congestion avoidance and control logic for reliable ringcast closely follows that of TCP and is well-known in the art.

Before a data transmission, $p_0$ establishes a congestion window, cwnd, a buffer for storing copies of packets (or pointers to copies of packets in memory) as well as a maximum size for the congestion window, wmax. In typical TCP implementations, the byte is used as the unit of measure for cwnd and wmax (as TCP is designed for transporting byte streams); however, for reliable ringcast it is much more convenient to use packets as the unit of measure for cwnd and wmax, at least in this description and possibly in practice. Hence, that convention is adopted here. The size of cwnd varies from 1 packet to wmax and is often initially set to 1. For reference, Windows 2000 operating system's default configuration sets wmax to 17520 bytes, which corresponds to the accumulated IP packet payload sizes of 12 packets that are bound to the Ethernet MTU size of 1500 bytes (which maps to 1460-byte IP packet payload size). wmax can be changed, but both Windows and Unix/Linux operating systems limit the maximum size of wmax to 64 KB, which equates to 44 packets of maximum size bounded by the Ethernet MTU.

The current size of cwnd controls the amount of bandwidth, or throughput, that is used by a reliable data transmission. It is useful to think of cwnd as tracking the number of packets (or the amount of payload data) that may be "in flight", or currently traversing the ring, at a given time. The throughput T may be estimated as the ratio cwnd/RTT, where RTT is the Ring Traversal Time for a packet. In TCP parlance, the acronym RTT is used to indicate round-trip time, the analog to ring traversal time. The maximum throughput Tmax is calculated as wmax/RTT. Note also that in practice, actual RTT will vary during the lifetime of the data transmission, and if an RTT estimate is needed to, e.g., adjust performance parameters such as wmax or calculate timeout periods, then one should use RTT estimation techniques similar to those typically used to estimate TCP RTT.

At the beginning of a ringcast, the initiating participant $p_0$ uses a slow-start algorithm to avoid congestion while estimating the available bandwidth in the TCP/IP network underlying the ring. $p_0$ sets cwnd to 1 packet, and launches a first packet into the ring. Because there is now one packet "in flight" and cwnd is set to 1, $p_0$ cannot launch a next packet until the first packet has traversed the ring. When the first packet has traversed the ring, $p_0$ doubles the size of cwnd to 2 packets, and then launches a second and third packet into the ring. Again, because there are two packets in flight and cwnd is set to 2, $p_0$ cannot launch more packets until the two packets have traversed the ring. When the two packets have successfully traversed the ring, $p_0$ doubles the size of cwnd to 4 packets, and then launches four more packets into the ring; and so on.

$p_0$ continues the process of launching packets into the ring and doubling the size of cwnd until one of these events occurs:

(a) $p_0$ finishes transmitting all of its data;

(b) cwnd grows to wmax; or (c) a packet drop is detected.

(a) is handled simply by $p_0$'s terminating the reliable ringcast session if the ringcast is one-to-many. If instead the ringcast is many-to-many, handling is different, as described below. (b) is handled by doing nothing other than continuing to transmit data, i.e., each time $p_0$ detects that a packet has traversed the ring, then cwnd is decremented, another packet may be launched (and then cwnd incremented). In TCP parlance, $p_0$ stops using the slow-start algorithm and instead transitions to using a congestion avoidance algorithm.

(c) is handled by $p_0$ by transitioning from using a slow-start algorithm to using a congestion avoidance algorithm, as follows: When $p_0$ detects a packet drop, it assumes that the drop occurred because some link in the network underlying the ring became congested, i.e., the amount of data (packets) attempting to traverse the link has exceeded the link capacity for a sufficiently long time such that the link's data buffer has overflowed (dropped packets). Hence, $p_0$ needs to reduce the amount of data it is sending into the network, and it does so by reducing cwnd by half, i.e., if cwnd was 16 packets when the packet drop was first detected, then cwnd is reset to 8 packets. After reducing cwnd by half, $p_0$ re-sends the dropped packet (as described above). As in-flight packets finish traversing the ring, $p_0$ increases cwnd by 1 each time it detects a ring traversal by a packet, instead of doubling cwnd as it does when using the slow-start algorithm. $p_0$ continues this process of increasing cwnd by 1 for each ring traversal until one of events (a), (b) or (c) occurs. For preciseness, if $p_0$ is already in a state that uses the congestion avoidance algorithm and then event (c) occurs, it handles event type (c) in the same way as described above, but of course it does not transition from slow-start to congestion avoidance because it is already using congestion avoidance.

As with packet detection and recovery algorithms, there are various "tweaks" and variations to the TCP slow-start and congestion avoidance algorithms that may be employed to improve some aspects of performance; similar tweaks and variations may be used in reliable ringcast, but are not described here. Their use and implementation would be well within the knowledge of one of ordinary skill in the art, and may be implemented without undue experimentation.

Many-to-Many Reliable Ringcast

For simplification, the above descriptions assumed a context of one-to-many reliable ringcast. Next, the extensions necessary to support many-to-many reliable ringcast are discussed. As noted above, the logic for one-to-many and many-to-many reliable ringcast should be unified by treating the one-to-many mode as a special case of the many-to-many mode, i.e., in practice, the many-to-many mode logic should generally be applied, with one-to-many mode occurring as a side effect of episodes during which there happens to be only one sourcing participant during a many-to-many reliable ringcast.

The following abbreviations will be used herein: "1-2-MRR" for one-to-many reliable ringcast; "M-2-MRR" for many-to-many reliable ringcast, and "RR" for (mode-independent) reliable ringcast.

As with other ringcast variants, M-2-MRR assumes that there is one ring participant that initiates a ringcast session, and therefore is the original creator of ringcast application packets. As before and without loss of generality, this initiating participant is identified as $p_0$. Also, there is an implicit assumption made in the descriptions below that a given sourcing participant is using only one channel at a time. This is done to simplify the descriptions, but in fact there is nothing in the logic that precludes a single sourcing participant from using multiple channels at the same time, although if this behavior is allowed, some method of ensuring fair sharing of channels among the participants should be designed and implemented.

Packet Creation, Transmission, and Re-Use

It was noted above that, for 1-2-MRR, a packet that has traversed the ring and arrived back at $p_0$ could be dropped, but that instead the packet should be re-used to support M-2-MRR. The reason packet re-use is necessary for M-2-MRR is that a packet $R_i$ created and launched by $p_0$ could be used by another participant $p_j$ to transmit data. Hence, unless the ringcast session has terminated, $p_0$ should never discard a packet and should instead re-use them.

For example, suppose $p_0$ creates $R_i$, writes a sequence number into PKT-SEQ-NO, sets Bit 0 of the IN-USE field in order to take ownership of channel 0, sets ID-0, SEQNO-0, and PAYLOAD-0, and then sends $R_i$ into the ring. When $R_i$ reaches participant $p_j$, as with 1-2-MRR $p_j$ processes $R_i$ by copying PAYLOAD-0 and SEQNO-0 in a local buffer allocated for $p_0$'s data, but then $p_j$ also wants to ringcast some data. $p_j$ checks if there are any available channels in $R_i$ for it to use by scanning the IN-USE field for a bit marked with a "0", and suppose it finds that Bit 1 is currently set to "0". $p_j$ marks Bit 1 with a "1", writes its participant ID value in ID-1, writes an arbitrary initial sequence number, e.g., 100, in SEQNO-1, writes the first 256 bytes of data into $PAYLOAD_1$, then forwards $R_i$ on to $p_{(j+1)}$. In this example, there are now two participants, $p_0$ and $p_j$, that are reliably ringcasting data on channels 0 and 1, i.e., this is a M-2-MRR.

When $R_j$ traverses the ring and arrives at $p_0$, $p_0$ cannot drop the packet but instead must re-use it and forward it on to $p_1$ because none of the participants $p_1$ through $p_{j-1}$ have seen the data that $p_j$ put into $R_i$. Also, consider that the initiating participant $p_0$ may have finished its data transmission, but other participants continue to ringcast. As the initiating participant, $p_0$ is responsible for managing the ringcast session, i.e., detecting and recovering from dropped packets, enforcing congestion avoidance, etc., and therefore needs to forward to $p_1$ any packets it receives from $p_{(N-1)}$.

When a participant is ringcasting by writing data into the packets, it must write data into contiguous packets, where "contiguous" packets are defined as packets with contiguous PKT-SEQ-NO values. This implies that each sourcing participant buffer packets traversing the ring as the participant receives and forwards them, in case the local application sourcing the data has not delivered the next chunk for the transmission.

By not dropping packets that have traversed the ring and instead re-using them to support M-2-MRR, $p_0$ needs to provide a FIFO buffer for incoming packets. Buffering is also needed to account for variations in $p_0$'s packet sending rates (in accordance with congestion avoidance, as discussed above) as well as variations in ring traversal time. When $p_0$ needs to send another packet into the ring, it must re-use the packet at the head of the incoming packet buffer. If the buffer is empty, then $p_0$ may create a new packet and send it, but it needs to create the packet in such a way that other participants do not mistakenly assume that unavailable channels are now available, e.g., $p_0$ should mark the IN-USE bits in the same way that the last packet it received from the ring was marked, and should use default or dummy values in other fields to indicate to other participants that they need to handle the lack of data for these other channels. If, however, $p_0$ is re-sending a copy of a dropped packet, then it must not re-use a packet at the head of the buffer but instead retrieve the locally stored information it has on the contents of the dropped packet, create a new one, and send it into the ring.

When $p_0$ re-uses a packet, it must also write the next packet sequence number in the PKT-SEQ-NO field, and then it must store a copy of the packet in local memory, in case the packet is dropped during ring traversal and a copy of it needs to be re-sent.

When a sourcing participant finishes with its datacast, it must identify packets in the ring (e.g., by checking ID-X values against its own ID) in which it marked an IN-USE field bit with a "1" and re-mark them with a "0". The sourcing participant must mark all such packets before beginning a new data transmission. Note that it could be the case that a participant $p_j$ finishes its cast, marks the IN-USE bit to "0", forwards the packet on to the next participant $p_{(j+1)}$ in the ring, at which time $p_{(j+1)}$ starts transmitting data by first marking the same IN-USE bit with a "1" that $p_j$ just finished using. Then participant $p_{(j+2)}$ through $p_{j-1}$ never see the Bit set to "0" and thus cannot depend on using the value of such a Bit to detect when a participant has stopped a ringcast. Hence, participants should track changes in pairs (IN-USE Bit X location, ID-X) to recognize when a participant has finished transmission and released the channel for use by another participant.

RRP Packet Processing

In M-2-MRR, when a participant receives a packet, it needs to check if a new transmission has begun. Any participant receiving an RRP packet needs to copy the active SEQNO and PAYLOAD field values into a local buffer that was allocated to receive data from the single sourcing participant. In M-2-MRR, a participant receiving a packet being used by multiple sourcing participants needs to allocate a buffer for each sourcing participant and copy sequence numbers and payload data into it.

Access Control for a Shared Transmission Medium

The ring may be modeled as a shared packet transport medium, and the participants may be modeled as competing for use of the shared medium. When the number of participants that want to cast data exceeds the available space (the available channels) in an RRP packet, then a medium access control (MAC) algorithm must be implemented. A simple MAC algorithm for M-2-MRR is as follows: If a participant wants to begin a new datacast, but all of the packet or packets that are currently being forwarded by the participant have all of their IN-USE fields' bits set to 1, then the participant must wait, or backoff, until it sees a packet with at least one IN-USE bit set to "0", at which time the participant may take control of the available channel by marking the IN-USE bit X with a "1" and writing the ID-X, SEQNO-X, and PAYLOAD-X fields accordingly. This simple MAC algorithm, however, is known to be problematic in highly competitive situations, e.g., some participants may starve and/or there is the potential for unequal sharing of the resource among the participants. Fair-sharing MAC algorithms are well-known, e.g., the MAC algorithm for 802.11 wireless networks, and for M-2-MRR a MAC algorithm may be modeled after them. MAC algorithms also need to perform collision management.

Session Termination $p_0$ may terminate a ringcast session under the following conditions: Suppose that for each packet $p_0$ is about to (re-)send into the ring, $p_0$ checks the IN-USE field for all zeroes, indicating that no one is transmitting. When $p_0$ first sees a packet $R_Z$ with all zeroes in the IN-USE field (and then sends it into the ring), it can enter a logic state where it is determining if it can terminate the session. After sending $R_Z$ into the ring, $p_0$ can keep checking subsequent packets received from $p_{(N-1)}$ for all zeroes in the IN-USE field, and as long as these packets have all zeroes in the IN-USE field, then they can be dropped, until $R_Z$ traverses the ring, at which point the ringcast session may be terminated. If, however, a packet received from $p_{(N-1)}$ has at least one "1" in the IN-USE field, then the session must be maintained.

Dropped Packet Detection and Recovery

As with 1-2-MRR, in M-2-MRR the initiating participant $p_0$ is responsible for dropped packet detection and recovery, and the logic employed by $p_0$ is the same for 1-2-MRR as for M-2-MRR. Recall that $p_0$ retains local copies of all packets that it has sent into the ring but that have not traversed the ring. $p_0$ detects a packet drop by tracking the PKT-SEQ-NO values of incoming packets and comparing them with the expected next sequence number value. When $p_0$ detects that a packet has been dropped, it retrieves the local copy of the packet and, without modifying the retrieved local copy of the packet, sends it into the ring.

Non-initiating participants also detect packet drops by tracking PKT-SEQ-NO values, and must participate in recovery, as follows: If a non-initiating participant $p_j$ is transmitting data by writing into channel X, it must retain a local copy of the PKT-SEQ-NO value and the values that it wrote into channel X. Suppose that $p_j$ wrote data into a packet $R_i$ and forwarded it on to $p_{j+1}$, but that subsequently $R_i$ was dropped before it finished traversing the ring. $p_0$ detects the drop and resends $R_i$. When $R_i$ arrives at $p_j$, $p_j$ must recognize that this is a re-sent packet (by tracking PKT-SEQ-NO values), retrieve the values it wrote into $R_i$ when $R_i$ passed through $p_j$ on its previous ring traversal attempt, write them into $R_i$ but without making other modifications, and forward it on to $p_{(j+1)}$, i.e., it must treat $R_i$ exactly as it did during $R_i$'s previous traversal attempt.

When a participant $p_k$ receives a recovered packet $R_i$ which either $p_k$ did not use for data transmission during $R_i$'s previous ring traversal attempt or which $p_k$ did not see during $R_i$'s previous ring traversal attempt because $R_i$ was dropped before reaching $p_k$, then $p_k$ must not write any values into $R_i$, e.g., if $p_k$ has started transmitting data since $R_i$ was initially launched into the ring, it cannot use available space in $R_i$ to transmit data. This rule may appear to be an exception to an above rule that requires sourcing participants to write their data into "contiguous" packets, but it is not because contiguity is defined in terms of PKT-SEQ-NO values, and the recovered $R_i$'s PKT-SEQ-NO value is not contiguous with those of packets that preceded it or followed it.

Collisions

Like many other shared medium protocols, M-2-MRR must employ a mechanism either to avoid collisions or detect and handle them appropriately. A collision is an event in which two or more participants concurrently begin transmitting on the same channel, i.e., they each want to begin a data transmission, they each see that the same IN-USE bit is set to "0" in the packets they are currently processing, and they each mark the IN-USE bit with a "1" and write their respective values in the corresponding ID-X, SEQNO-X, and PAYLOAD-X fields, with the expectation that the channel is available to them for the lifetime of their data transmission. But, as these packets traverse the ring, each of the colliding participants will be forced to halt their transmissions prematurely because they will discover that the channel is not available.

For a concrete example of a collision scenario, consider two adjacent participants $p_{j-1}$ and $p_j$, and $p_j$ is waiting for a channel to become available, but $p_{j-1}$ is not. $p_{j-1}$ receives a packet $R_i$ that has an available channel (a Bit X in the IN-USE array is "0"), but since $p_{j-1}$ does not currently want to transmit data, it processes the packet and forwards it on to $p_j$. Immediately after forwarding $R_i$, $p_{j-1}$ decides to begin a transmission. It detects that the next packet it receives, $R_{i+1}$, has an available channel because there is a "0" in Bit X of the IN-USE array, so it marks the bit with a "1", writes ID-X, SEQNO-X, and PAYLOAD-X values, and forwards $R_{i+1}$ on to $p_j$.

Meanwhile, when $p_j$ receives $R_i$, it notices that a channel is now available because there is a "0" in Bit X of the IN-USE array; so, it marks Bit X with a "1", writes ID-X, SEQNO-X, and PAYLOAD-X values, and forwards $R_i$ on to $p_{(j+1)}$. Next, it receives $R_{i+1}$, expecting the Bit X value to be "0", but it is set to "1" because $p_{j-1}$ already owns the channel, creating a conflict.

There are two approaches to collision management: (a) collision avoidance, in which the MAC protocol ensures that a collision cannot occur, and (b) collision detection, in which the MAC protocol detects when collisions occur and handles them gracefully. Collision management is a broad subject, and will not be treated here other than to suggest that for M-2-MRR, it may be more efficient to employ collision avoidance instead of collision detection. No specific collision management approach is preferred; in practice, a method modeled after some well-known collision avoidance techniques, such as that employed by 802.11 wireless ad hoc networks or by Apple's LocalTalk protocol, must be used by M-2-MRR.

Efficiency Considerations

The Simple RRP packet and associated processing logic is sufficient for an effective M-2-MRR implementation; however, because the Simple RRP packet structure is static, it will often lead to space and bandwidth inefficiencies. For example, when only one participant is transmitting, only one-fourth of the payload capacity, 256 bytes, is in-use, yet the Simple RRP packet size is 1045 bytes, yielding an effective throughput efficiency of approximately 25%. In this subsection, a more complex packet protocol and associated processing logic that should improve space and bandwidth efficiencies in most cases are described.

Efficient Payload Reliable Ringcast Protocol

Figure 4:
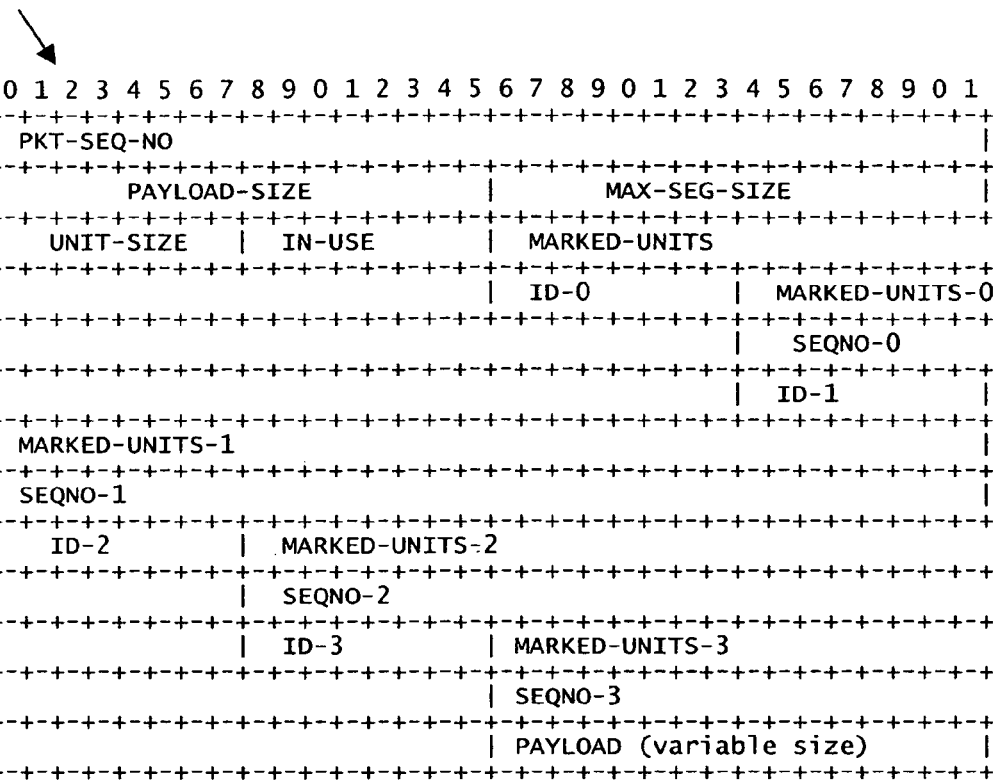
FIG. 4 is a representation of the information contained in a second signal used to practice the inventive method.

Consider the Efficient Payload RRP (EP-RRP) packet shown in FIG. 4. This protocol, like Simple RRP, uses a fixed-size header and also limits the number of channels to four (in practice, it should not be problematic to increase the number of channels to, e.g., eight, as this would only increase the EP-RRP header size by 36 bytes, from 50 bytes to 86 bytes). Unlike Simple RRP, however, the payload size, and therefore the packet size, will vary according to the current data transmission requirements of sourcing participants. It is possible to design an even more space-efficient and flexible protocol that varies the header size according to the number of sourcing participants, but given that (a) the EP-RRP header is small relative to expected packet/payload sizes and therefore not too inefficient;

(b) to support a variable size header, packet processing logic would be even more complex than for EP-RRP but with little efficiency gain; and (c) in general, ringcast targets small-scale multicasts vs. Internet-scale multicasts, and therefore the expected number of participants in a reliable ringcast session that are concurrently attempting to transmit data is expected to be on the order of 10 or less, then it is questionable whether a protocol supporting a variable-size header has a favorable cost-benefit ratio under expected circumstances and operating conditions.

The fields in the EP-RRP packet have the following interpretations:

PKT-SEQ-NO: Same interpretation as for Simple RRP.

PAYLOAD-SIZE: Contains the size of the payload, measured in bytes. While not absolutely necessary for reliable ringcast, it is helpful for participants to know the payload size without having to compute it so that, e.g., local buffers for storing the payload may be allocated quickly and efficiently.

MAX-SEG-SIZE: The maximum size, in bytes, of a segment of information that any sourcing participant may place in the EP-RRP payload; or equivalently, the maximum amount of data that may be transmitted in a channel within each EP-RRP packet. This value should be configured by the reliable ringcast application and should be chosen such that the product of the number of channels supported by the EP-RRP protocol (four, in this case) and the MAX-SEG-SIZE should be less than 64 KB (65,536 bytes), or the maximum value for the size of an IP packet (65,535 bytes). More precisely, the product should not exceed 64 KB minus the number of bytes in the IP header (24 bytes), the number of bytes in the UDP header (8 bytes), and the number of bytes in the EP-RRP header (50 bytes for the proposed EP-RRP header above). This argues for MAX-SEG-SIZE being configured to 8 KB or less for EP-RRP.

UNIT-SIZE: The PAYLOAD field is logically partitioned into blocks of size UNIT-SIZE bytes. Sourcing participants write their data into available blocks in the PAYLOAD; these written blocks are not necessarily contiguous, i.e., data for the same channel is not necessarily written in contiguous blocks. The partitioning of PAYLOAD into unit-size blocks is the logic that enables space efficiency and variable-size packets and supports PAYLOAD fragmentation management.

IN-USE: Same interpretation as for Simple RRP.

MARKED-UNITS: A 32-bit array indicating which blocks of the PAYLOAD are in use by a sourcing participant, i.e., a "1" in Bit 0 indicates that some sourcing participant has data in the first UNIT-SIZE bytes of the PAYLOAD; in general, a "1" in Bit X indicates that some sourcing participant has data in the (X+1)th block of the PAYLOAD. Conversely, a "0" in Bit X indicates that the (X+1)th block of the PAYLOAD is available for use by some sourcing participant to write data.

The size, 32 bits, of the MARKED-UNITS array dictates the values of MAX-SEG-SIZE and UNIT-SIZE as follows: The product of MAX-SEG-SIZE and the number of channels (four) supported by EP-RRP, divided by the UNIT-SIZE value must equal 32, the size in bits of MARKED-UNITS. This rule constrains the values of MAX-SEG-SIZE, UNIT-SIZE, and the number of participants to a power of 2. For example, if MAX-SEG-SIZE is chosen to be 4 KB, and the number of channels is four, then UNIT-SIZE is 512 bytes (512=(4 KB×4)/32).

ID-X: Same interpretation as for Simple RRP.

MARKED-UNITS-X: A 32-bit array indicating which blocks of the PAYLOAD are in use by the sourcing participant with the (unique) ID indicated in the ID-X field, i.e., the sourcing participant that currently owns this channel X. Note that MARKED-UNITS is the bit-wise sum of the MARKED-UNITS-X fields; hence, MARKED-UNITS is not strictly necessary, but is included in EP-RRP to assist a sourcing participant in quickly locating and allocating available blocks in PAYLOAD.

SEQNO-X: Same interpretation as for Simple RRP.

PAYLOAD: A variable size field which contains data written by the sourcing participants.

EP-RRP Packet Processing Logic

Compared to when Simple RRP is used, the reliable ringcast logic is the same when EP-RRP is used except for the packet processing, i.e. the reading and writing of channel data, performed by each ring participant.

When a non-sourcing participant $p_n$ receives an EP-RRP packet, as in the case of Simple RRP, it needs to copy the meaningful data in the PAYLOAD into local buffers. To do this, $p_n$ first examines the IN-USE array for any "1" bits indicating which channels are currently being used by sourcing participants. For each such sourcing participant, $p_n$ needs to read the associated ID-X value to match the transmission with an existing allocated buffer, or if this is a new transmission, to create a new buffer associated with ID-X for storing the data transmission. $p_n$ then scans the MARKED-UNIT-X array for bits marked with a "1", and for each "1" bit found, $p_n$ reads the associated data block in PAYLOAD into the local buffer (using the SEQNO-X value to correctly position the data in the buffer).

When a sourcing participant $p_s$ receives an EP-RRP packet (or if the participant is the initiating participant $p_0$ and creates a new EP-RRP packet), if $p_s$ is beginning a new transmission, then it first locates a "0" bit, say Bit X, in the IN-USE array, marks it, and writes its ID value in ID-X and an arbitrary beginning sequence number in SEQNO-X. $p_s$ then scans the MARKED-UNITS array from left-to-right, and for each "0" bit it finds, it (a) writes a "1" in that location to indicate its usage of the corresponding block in the PAYLOAD, (b) writes a "1" into the same relative location in the MARKED-UNITS-X array, and (c) then writes data into the corresponding block in PAYLOAD. $p_s$ continues locating available blocks in PAYLOAD in a similar fashion until either it has written MAX-SEG-SIZE bytes of data into the PAYLOAD, or it has finished writing all of its data.

When writing data into a packet, $p_s$ is also responsible for increasing the size of the packet, if necessary. For example, suppose Bit Y in the MARKED-UNITS array is the rightmost bit marked with a "1" when $p_s$ begins writing data into a packet's PAYLOAD. If $p_s$ writes into blocks beyond the PAYLOAD block associated with Bit Y, then $p_s$ needs to extend the packet size (e.g., by allocating more space in local memory where it is temporarily storing the packet as it is being updated) and update the value in the PAYLOAD-SIZE field accordingly.

If $p_s$ is writing into a packet which it used earlier to transmit data during the packet's previous traversal of the ring, $p_s$ must re-use PAYLOAD blocks it used on the previous traversal, and it must re-use them in the same left-to-right order as when the blocks were written previously. If $p_s$ does not use all of the previous blocks, it must properly mark "0"'s in the associated bits in the MARKED-UNITS and MARKED-UNITs-X arrays, and if warranted, $p_s$ should reduced the size of the PAYLOAD and update the PAYLOAD-SIZE field.

When a sourcing participant $p_s$ has finished its data transmission on channel X, it must "zero out" the packets currently in the ring that it earlier allocated for transmission, i.e., it needs to check incoming packets for a "1" in the IN-USE array and check that the corresponding ID-X field has its ID value written in it. It must change the "1" to a "0" in the IN-USE array, it must change all of the "1"'s in the MARKED-UNITS-X array to "0"'s, and also change the corresponding "1"'s in the MARKED-UNITS array to "0"'s. It must do this for all such packets in the ring, and cannot begin another data transmission until it has "zeroed-out" all such packets. This is analogous in function to the description for the above case when Simple RRP is used. Also, as above, $p_s$ is responsible for reducing the size of the PAYLOAD, if warranted, and updating the PAYLOAD-SIZE field accordingly.

Thus, while we have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of linking a plurality of participants for a ringcast, comprising the steps of:
    a) establishing a plurality of N participants $p_i$ to participate in said ringcast;
    b) selecting a first participant as an initiating participant $p_0$ from said plurality of N participants $p_i$;
    c) ordering the remainder of said plurality of N participants $p_i$, so that said remainder of said plurality of N participants $p_i$, are identified as participants $p_1$ through $p_{N-1}$;
    d) connecting said plurality of N participants $p_i$ in a ring whereby each of said plurality of N participants $p_i$ is connected to a preceding participant $p_{i-1}$ and a succeeding participant $p_{i+1}$, whereby said initiating participant $p_0$ is connected to said participant $p_{N-1}$ as its preceding participant and to participant $p_1$ as its succeeding participant, thereby completing said ring;
    e) accepting an input S(C, 0) from a contributing participant $p_C$ which is identified with a first input data index range $t_0$;
    f) saving input S(C, 0), with an associated source identifier;
    g) transmitting an initial input S(0, 0) from said initiating participant $P_0$ to its succeeding participant $p_1$, as a first signal A(0, 0);
    h) combining said initial input S(0, 0) from said initiating participant $p_0$ with an input S($C_i$, 0) accepted by the next succeeding participant $p_i$ who is a contributing participant $p_C$, thereby forming a first combined signal A(1, 0);
    i) transmitting said first combined signal A(1, 0) to the next succeeding participant $p_2$;
    j) combining said first combined signal A(1, 0) with the input S(2, 0) accepted by said next succeeding participant $p_2$, if said next succeeding participant is also a contributing participant $p_C$, to form thereby a second combined signal A(2, 0) representing a combination of signals from each preceding contributing participant $p_C$ starting at said initiating participant $p_0$ and including said next succeeding participant $p_2$, combined in accordance with a predetermined formula;
    k) repeating steps i) and j) until a combined signal A(N–0, 0) is transmitted from participant $p_{N-1}$ to said initiating participant $p_0$, said combined signal A(N–1, 0) representing a combined signal containing all of the desired inputs S($C_i$, 0) of all contributing participants $p_C$ from among participants $p_0$ through $p_{N-1}$, combined in accordance with said predetermined formula;
    l) if said received signal A(N–1, 0) contains a source identifier indicating that said signal A(N–1, 0) originated with said initiating participant $p_0$, comparing said signal A(N–1, 0) with said stored input S(C, 0), to determine if said input S(C, 0) has completely traversed said ring;
    m) if said input S(C, 0) has completely traversed said ring, removing input S(0, 0) from said combined signal A(N–0, 0);
    n) if said input S(C, 0) has not completely traversed said ring, repeat steps i), j), k) and l) until it is determined that said input S(C, 0) has completely traversed said ring; and then
    o) replacing input S(0, 0) in said combined signal A(N–1, 0) with an input S(0,M), where M represents data which is identified with an index range $t_M$ subsequent to said first index range $t_0$, after said signal A(N–1, 0) is received by participant $p_0$; and
    p) repeating steps i), j), k), l), m), n) and o) until said ringcast is completed.

2. The method of claim 1, wherein said input S(C, 0), together with said associated source identifier are stored locally with said initiating participant $p_0$.

3. The method of claim 1, further comprising the steps of:
    adding a sequence identifier to said input S(C, 0); and
    comparing any sequence identifier in a signal A(N–0, 0) received by participant $p_0$ with the sequence identifier of each signal previously transmitted by said participant $p_0$ to determine if said received signal contains the next expected input S(C, 0); and
    if said received signal does not contain said expected input S(C, 0), then go to step n).

4. The method of claim 3, further comprising the step of re-sequencing data to a predetermined order based upon said sequence identifier.

5. The method of claim 1, further comprising the step of ignoring any duplicate input S(C, 0) received as a result of re-transmission of a dropped input.

* * * * *